(12) United States Patent
Littrell (10) Patent No.: US 9,505,317 B2
(45) Date of Patent: Nov. 29, 2016

(54) SYSTEM AND METHOD FOR ELECTRIC VEHICLE CHARGING AND BILLING USING A WIRELESS VEHICLE COMMUNICATION SERVICE

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 12/341,875

(22) Filed: Dec. 22, 2008

(65) Prior Publication Data

US 2010/0161481 A1   Jun. 24, 2010

(51) Int. Cl.
*G06Q 50/06*    (2012.01)
*B60L 11/18*    (2006.01)
(Continued)

(52) U.S. Cl.
CPC .............. *B60L 11/1824* (2013.01); *B60L 3/12* (2013.01); *B60L 11/184* (2013.01); *B60L 11/1846* (2013.01); *B60L 11/1848* (2013.01); *G06Q 20/102* (2013.01); *G06Q 20/127* (2013.01); *G06Q 20/3278* (2013.01); *G06Q 50/06* (2013.01); *G07F 15/005* (2013.01); *G07F 15/04* (2013.01); *G07F 17/0014* (2013.01); *B60L 2240/72* (2013.01); *B60L 2240/80* (2013.01); *B60L 2250/16* (2013.01); *B60L 2270/36* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ....... G06Q 50/06; Y02T 90/10; Y02T 90/12; Y02T 90/14; Y02T 10/7088
USPC .......................... 705/412; 320/109; 340/932
See application file for complete search history.

(56) References Cited

U.S. PATENT DOCUMENTS 3,775,593 A   11/1973   Gieringer et al.
4,052,655 A   10/1977   Vizza (Continued)

FOREIGN PATENT DOCUMENTS

CN   2573304 Y   9/2003
CN   200953476 Y   9/2007

(Continued)

OTHER PUBLICATIONS

Rich Housh & Kathy Ellington, "Plug-in Hybrid Electric Vehicle Smart Charging," available at http://www.eei.org/meetings/Meeting%20Documents/2009-04-05-Mon-Ellington.pdf (last visited Jul. 23, 2009).

(Continued)

Primary Examiner — Sara C Hamilton
(74) Attorney, Agent, or Firm — General Electric Company (57) ABSTRACT

A vehicle charging station for use in transmitting charging power to an electric vehicle for use in charging the vehicle is configured to communicatively couple to the electric vehicle via a network connection to a wireless network provider and electrically couple to the electric vehicle via a connector. Vehicle charging station is further configured to receive a unique identifier from the electric vehicle via the network connection, deliver a quantity of electrical charging power to the electric vehicle via the connector, and meter the quantity of electrical charging power delivered to the electric vehicle.

13 Claims, 3 Drawing Sheets

(51) Int. Cl.
*B60L 3/12* (2006.01)
*G06Q 20/10* (2012.01)
*G06Q 20/12* (2012.01)
*G06Q 20/32* (2012.01)
*G07F 15/00* (2006.01)
*G07F 15/04* (2006.01)
*G07F 17/00* (2006.01)

(56) References Cited

U.S. PATENT DOCUMENTS

| | | | |
|---|---|---|---|
| 4,090,577 A | 5/1978 | Moore | |
| 4,532,418 A | 7/1985 | Meese et al. | |
| 4,592,436 A | 6/1986 | Tomei | |
| 4,629,874 A | 12/1986 | Pugsley et al. | |
| 4,731,575 A | 3/1988 | Sloan | |
| 5,072,380 A | 12/1991 | Randelman et al. | |
| 5,101,200 A | 3/1992 | Swett | |
| 5,146,067 A | 9/1992 | Sloan et al. | |
| 5,202,617 A | 4/1993 | Nor | |
| 5,247,304 A | 9/1993 | D'Hont | |
| 5,266,947 A | 11/1993 | Fujiwara et al. | |
| 5,296,746 A | 3/1994 | Burkhardt | |
| 5,297,664 A | 3/1994 | Tseng et al. | |
| 5,306,999 A | 4/1994 | Hoffman | |
| 5,316,101 A | 5/1994 | Gannon | |
| 5,327,066 A | 7/1994 | Smith | |
| 5,351,052 A | 9/1994 | D'Hont et al. | |
| 5,351,187 A | 9/1994 | Hassett | |
| 5,414,624 A | 5/1995 | Anthonyson | |
| 5,428,363 A | 6/1995 | D'Hont | |
| 5,451,755 A | 9/1995 | Duval et al. | |
| 5,459,304 A | 10/1995 | Eisenmann | |
| 5,461,298 A | 10/1995 | Lara et al. | |
| 5,462,439 A | 10/1995 | Keith | |
| 5,485,510 A | 1/1996 | Colbert | |
| 5,488,376 A | 1/1996 | Hurta et al. | |
| 5,491,483 A | 2/1996 | D'Hont | |
| 5,512,787 A | 4/1996 | Dederick | |
| 5,513,525 A | 5/1996 | Schurmann | |
| 5,534,759 A | 7/1996 | Evans et al. | |
| 5,548,200 A | 8/1996 | Nor | |
| 5,552,789 A | 9/1996 | Schuermann | |
| 5,563,491 A | 10/1996 | Tseng | |
| 5,573,090 A | 11/1996 | Ross | |
| 5,577,109 A | 11/1996 | Stimson et al. | |
| 5,583,418 A | 12/1996 | Honda et al. | |
| 5,602,919 A | 2/1997 | Hurta et al. | |
| 5,604,342 A | 2/1997 | Fujioka | |
| 5,605,182 A | 2/1997 | Oberrecht et al. | |
| 5,614,808 A | 3/1997 | Konoya et al. | |
| 5,640,002 A | 6/1997 | Ruppert et al. | |
| 5,675,342 A | 10/1997 | Sharpe | |
| 5,684,379 A | 11/1997 | Svedoff | |
| 5,692,132 A | 11/1997 | Hogan | |
| 5,698,837 A | 12/1997 | Furuta | |
| 5,699,528 A | 12/1997 | Hogan | |
| 5,701,127 A | 12/1997 | Sharpe | |
| 5,704,046 A | 12/1997 | Hogan | |
| 5,742,229 A | 4/1998 | Smith | |
| 5,745,052 A | 4/1998 | Matsuyama et al. | |
| 5,774,882 A | 6/1998 | Keen et al. | |
| 5,797,085 A | 8/1998 | Beuk et al. | |
| 5,797,133 A | 8/1998 | Jones et al. | |
| 5,809,142 A | 9/1998 | Hurta et al. | |
| 5,828,738 A | 10/1998 | Spaeth | |
| 5,847,537 A | 12/1998 | Parmley, Sr. | |
| 5,878,215 A | 3/1999 | Kling et al. | |
| 5,887,266 A | 3/1999 | Heinonen et al. | |
| 5,905,247 A | 5/1999 | Ilen | |
| 5,955,717 A | 9/1999 | Vanstone | |
| 5,974,403 A | 10/1999 | Takriti et al. | |
| 5,987,140 A | 11/1999 | Rowney et al. | |
| 5,991,750 A | 11/1999 | Watson | |
| 5,998,963 A | 12/1999 | Aarseth | |
| 6,012,049 A | 1/2000 | Kawan | |
| 6,064,320 A | 5/2000 | d'Hont et al. | |
| 6,073,840 A | 6/2000 | Marion | |
| 6,081,205 A | 6/2000 | Williams | |
| 6,107,691 A | 8/2000 | Gore et al. | |
| 6,109,525 A | 8/2000 | Blomqvist et al. | |
| 6,112,152 A | 8/2000 | Tuttle | |
| 6,116,505 A | 9/2000 | Withrow | |
| 6,157,162 A | 12/2000 | Hayashi et al. | |
| 6,285,162 B1 | 9/2001 | Koo | |
| 6,317,721 B1 | 11/2001 | Hurta et al. | |
| 6,340,935 B1 | 1/2002 | Hall | |
| 6,481,622 B2 | 11/2002 | Hjelmvik | |
| 6,487,508 B1 | 11/2002 | Suzuki et al. | |
| 6,513,015 B2 | 1/2003 | Ogasawara | |
| 6,547,133 B1 | 4/2003 | DeVries, Jr. et al. | |
| 6,586,668 B2 | 7/2003 | Shugar et al. | |
| 6,609,655 B1 | 8/2003 | Harrell | |
| 6,614,204 B2 | 9/2003 | Pellegrino et al. | |
| 6,656,778 B1 | 12/2003 | Chen et al. | |
| 6,673,479 B2 | 1/2004 | McArthur et al. | |
| 6,696,925 B1 | 2/2004 | Aiello, Jr. | |
| 6,714,844 B1 | 3/2004 | Dauner et al. | |
| 6,756,765 B2 * | 6/2004 | Bruning | 320/108 |
| 6,758,291 B1 | 7/2004 | Koch | |
| 6,836,737 B2 | 12/2004 | Petite et al. | |
| 6,910,439 B2 | 6/2005 | Baba et al. | |
| 6,963,186 B2 | 11/2005 | Hobbs | |
| 7,081,832 B2 | 7/2006 | Nelson et al. | |
| 7,141,321 B2 | 11/2006 | McArthur et al. | |
| 7,142,099 B2 | 11/2006 | Ross et al. | |
| 7,209,840 B2 | 4/2007 | Petite et al. | |
| 7,236,103 B2 | 6/2007 | Pammer et al. | |
| 7,239,226 B2 | 7/2007 | Berardi et al. | |
| 7,249,112 B2 | 7/2007 | Berardi et al. | |
| 7,312,707 B1 | 12/2007 | Bishop et al. | |
| 7,338,335 B1 | 3/2008 | Messano | |
| 7,411,371 B2 | 8/2008 | Hobbs | |
| 7,429,112 B2 | 9/2008 | Metcalfe | |
| 7,434,636 B2 | 10/2008 | Sutherland | |
| 7,469,541 B1 | 12/2008 | Melton et al. | |
| RE41,085 E | 1/2010 | Anthonyson | |
| 7,693,609 B2 * | 4/2010 | Kressner et al. | 700/291 |
| 7,792,613 B2 | 9/2010 | Kressner et al. | |
| 7,885,893 B2 | 2/2011 | Alexander | |
| 8,019,483 B2 | 9/2011 | Keefe | |
| 2001/0026609 A1 | 10/2001 | Weinstein et al. | |
| 2002/0052754 A1 | 5/2002 | Joyce et al. | |
| 2002/0132144 A1 | 9/2002 | McArthur et al. | |
| 2003/0004792 A1 | 1/2003 | Townzen et al. | |
| 2003/0105662 A1 | 6/2003 | Koketsu et al. | |
| 2003/0120442 A1 | 6/2003 | Pellegrino et al. | |
| 2003/0129884 A1 | 7/2003 | Wakamatsu | |
| 2003/0146852 A1 | 8/2003 | O'Dell | |
| 2003/0209375 A1 | 11/2003 | Suzuki et al. | |
| 2004/0079799 A1 | 4/2004 | Symonds et al. | |
| 2004/0104814 A1 | 6/2004 | Christensen et al. | |
| 2004/0153782 A1 | 8/2004 | Fukui et al. | |
| 2004/0200899 A1 | 10/2004 | Jeng et al. | |
| 2005/0008132 A1 | 1/2005 | Paschini et al. | |
| 2005/0057373 A1 | 3/2005 | Noguchi | |
| 2005/0119010 A1 | 6/2005 | Yasukawa | |
| 2005/0273505 A1 | 12/2005 | Kim | |
| 2006/0012473 A1 | 1/2006 | Bishop et al. | |
| 2006/0041513 A1 | 2/2006 | Yuhara et al. | |
| 2006/0180647 A1 | 8/2006 | Hansen | |
| 2006/0193282 A1 | 8/2006 | Ikawa et al. | |
| 2006/0202862 A1 | 9/2006 | Ratnakar | |
| 2006/0259447 A1 | 11/2006 | Kings et al. | |
| 2007/0094069 A1 | 4/2007 | Berman | |
| 2007/0126395 A1 | 6/2007 | Suchar | |
| 2007/0255612 A1 | 11/2007 | Baraty | |
| 2008/0007202 A1 * | 1/2008 | Pryor | 320/104 |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |

(56) References Cited

U.S. PATENT DOCUMENTS

| | | |
|---|---|---|
| 2008/0040479 A1 | 2/2008 | Bridge et al. |
| 2008/0052145 A1 | 2/2008 | Kaplan et al. |
| 2008/0067974 A1 | 3/2008 | Zhang et al. |
| 2008/0150284 A1 | 6/2008 | Fein et al. |
| 2008/0150290 A1 | 6/2008 | Fein et al. |
| 2008/0203966 A1 | 8/2008 | Ward |
| 2008/0203973 A1 | 8/2008 | Gale et al. |
| 2008/0228613 A1 | 9/2008 | Alexander |
| 2008/0270227 A1 | 10/2008 | Al Amri |
| 2008/0281663 A1 | 11/2008 | Hakim et al. |
| 2009/0062967 A1 | 3/2009 | Kressner et al. |
| 2009/0091291 A1* | 4/2009 | Woody et al. ............... 320/109 |
| 2009/0115371 A1 | 5/2009 | Chawla et al. |
| 2009/0144150 A1 | 6/2009 | Sakakibara et al. |
| 2009/0174365 A1 | 7/2009 | Lowenthal et al. |
| 2009/0177580 A1 | 7/2009 | Lowenthal et al. |
| 2009/0177595 A1 | 7/2009 | Dunlap et al. |
| 2009/0224869 A1 | 9/2009 | Baker et al. |
| 2009/0313033 A1 | 12/2009 | Hafner et al. |
| 2009/0313034 A1* | 12/2009 | Ferro et al. ................... 705/1 |
| 2009/0313103 A1* | 12/2009 | Ambrosio et al. ......... 705/14.25 |
| 2009/0313104 A1* | 12/2009 | Hafner et al. ............ 705/14.25 |
| 2009/0313174 A1* | 12/2009 | Hafner et al. ................. 705/80 |
| 2010/0010685 A1 | 1/2010 | Kang |
| 2010/0045232 A1* | 2/2010 | Chen et al. ................... 320/109 |
| 2010/0049396 A1* | 2/2010 | Ferro et al. ...................... 701/33 |
| 2010/0049610 A1* | 2/2010 | Ambrosio et al. ......... 705/14.62 |
| 2010/0049639 A1 | 2/2010 | Ferro et al. |
| 2010/0049737 A1* | 2/2010 | Ambrosio et al. ......... 707/104.1 |
| 2010/0065627 A1* | 3/2010 | Outwater ....................... 235/381 |
| 2010/0079004 A1* | 4/2010 | Keefe ............................. 307/80 |
| 2010/0082464 A1* | 4/2010 | Keefe ............................. 705/32 |
| 2010/0141203 A1* | 6/2010 | Graziano et al. ............ 320/109 |
| 2010/0145837 A1* | 6/2010 | Graziano et al. ............... 705/34 |
| 2010/0145885 A1* | 6/2010 | Graziano et al. ............. 705/412 |
| 2011/0153131 A1 | 6/2011 | Kressner et al. |
| 2011/0153474 A1 | 6/2011 | Tormey et al. |

FOREIGN PATENT DOCUMENTS

| | | |
|---|---|---|
| CN | 101076190 A | 11/2007 |
| CN | 101082959 A | 12/2007 |
| DE | 10304284 A1 | 8/2004 |
| EP | 0479290 A2 | 4/1992 |
| EP | 1205340 A1 | 5/2002 |
| EP | 1588930 A1 | 10/2005 |
| EP | 1862986 A1 | 5/2007 |
| GB | 2430529 A | 3/2007 |
| GB | 2438979 A | 12/2007 |
| JP | 05256038 A1 | 5/1993 |
| JP | 2010-512727 | 2/2000 |
| JP | 2002150337 A | 5/2002 |
| JP | 2006215779 A | 8/2006 |
| JP | 2008-065635 A | 3/2008 |
| JP | 2000-045869 A | 4/2010 |
| WO | 02063742 A1 | 8/2002 |
| WO | 2007141543 A2 | 12/2007 |
| WO | 2008073453 A1 | 6/2008 |
| WO | 2008107767 A2 | 9/2008 |

OTHER PUBLICATIONS

PCT, International Search Report for International Patent Application No. PCT/US2009/065229, dated Feb. 25, 2010, 4 pages.

European Patent Office, Search Report for European Patent Application No. 09178452.0-2207, dated Mar. 23, 2010, 4 pages.

European Patent Office Search Report, EP09178316, Reference 233500/14458, Application No./Patent No. 09178316.7-2221, Feb. 12, 2010, 7 pages.

EP Foreign Search Report for Application No. 09178313.4-2221 dated Jan. 26, 2010.

Radio Frequency Identification Tag Application for Tracking Vehicle Refueling, Maintenance, and Theft, XP000694521, IBM Technical Disclosure Bulletin, Mar. 1997, pp. 81-82, vol. 40, No. 03.

Green Car Versatile Plug, ip.com Prior Art Database, http://www.ip.com/pubview///IPCOM000177564D, IBM, Dec. 18, 2008, 4 pages.

C.M. Roberts, Radio Frequency Identification (RFID), Department of Information Sciences, Otago University, New Zealand, Science Direct, Computers & Security, 2006, pp. 18-26, vol. 25, Elsevier Ltd.

Patent Cooperation Treaty, PCT/US2009/065356, Notification of Transmittal of The International Search Report and The Written Opinion of the International Searching Authority, or the Declaration, Mar. 31, 2010, 14 pages.

Patent Cooperation Treaty, PCT/US2009/066930, Notification of Transmittal of The International Search Report and The Written Opinion of the International Searching Authority, or the Declaration, Jun. 25, 2010, 10 pages.

Chinese Search Report for Application 200980152817.8 dated Dec. 11, 2012.

Chinese Office Action for Application 200980152817.8 dated Dec. 26, 2012.

Chinese Office Action for Application 200980152855.3 dated Jan. 14, 2013.

Chinese Search Report for Application 200980152855.3 dated Dec. 20, 2012.

Unofficial translation of Japanese Office Action for Japanese Application No. 2011-542190 dated Oct. 8, 2013.

Unofficial translation of Chinese Office Action for Chinese Application No. 200980152855.3 dated Sep. 16, 2013.

Unofficial translation of Chinese Office Action for Chinese Application No. 200980152855.3 dated Sep. 5, 2013.

The Associated Press, Hawaii to be First with Electric Car Stations, Dec. 3, 2008, 2 pages, MSNBC.com.

IBM Technical Disclosure, Green Car Versatile Plug, IPCOM000177564D, Dec. 28, 2008.

\* cited by examiner

SYSTEM AND METHOD FOR ELECTRIC VEHICLE CHARGING AND BILLING USING A WIRELESS VEHICLE COMMUNICATION SERVICE

BACKGROUND OF THE INVENTION

The subject matter disclosed herein relates generally to the charging of a mobile electric load and more specifically, to systems and methods for use in identifying an electric vehicle for use in an electric charging transaction.

As electric vehicles and hybrid electric vehicles gain popularity, an associated need to accurately manage delivery of electrical charging power to them has increased. Moreover, a need to recognize revenue due to the electricity supplier is created by the increased use of such vehicles.

At least some known transaction systems facilitate identifying a vehicle during a transaction via wireless communications such as RFID and remote transmitters. For example, at least some of such systems read a prepaid RFID card carried within a vehicle to collect expressway tolls while the vehicle moves within a predetermined range of speed through a toll booth. The vehicle is identified based on the RFID card and a toll amount is automatically deducted from an existing account.

Moreover, at least some known communications systems enable the distribution of data, such as operating data, between a vehicle on-board computer and transponders located either within the vehicle or remotely from the vehicle. For example, transponders within the vehicle may communicate vehicular operating conditions to the on-board computer. Moreover, transponders remote to the vehicle may communicate toll booth information, service information, parking costs, and/or road conditions to the on-board computer. Furthermore, at least some known transaction systems enable transaction information to be communicated between a vehicle-mounted interface and a remote transaction unit. For example, transaction information may be communicated between the vehicle-mounted interface system and a bank teller unit used to withdraw and /or deposit funds to an account. Moreover, transaction information may be communicated between the vehicle-mounted interface system and a drive-through point-of-sale system used to purchase goods and/or services.

In addition, at least some known electricity delivery systems provide electric metering at a customer's premises. For example, some delivery systems use an encoded magnetic strip applied to a card to transfer purchase information between a utility billing office and a utility metering and control device located at the customer's premises. A credit meter stored within the control device deducts a value associated with a quantity of electricity consumed at the customer's premises. Some of such systems also enable the use of an emergency card that includes a similar encoded magnetic strip when the customer's account with the pre-purchased quantity is exhausted. However, generally such systems do not meter electrical charging power delivered to a specific electric load, and are thus not compatible for use with electric vehicles.

Furthermore, at least some known systems enable remote monitoring of electricity consumption. For example, some delivery systems provide remote monitoring via wireless communication between a communication device associated with an electricity meter and a site controller. More specifically, a communication device receives data from an associated electric meter that is indicative of a quantity of electricity metered, and generates a transmitted message to the site controller via a wireless communication network. However, such systems are intended for use in metering electricity for a stationary site and not for use with a normally mobile electric load, such as an electric vehicle.

However, none of the above-described communication and/or transaction systems enable an electric vehicle charging station to obtain a unique identifier of an electric vehicle for use in a transaction that includes delivering electrical charging power to the electric vehicle. Accordingly, systems and methods that facilitate identifying an electric vehicle prior to delivering electrical charging power and/or recognizing revenue from the delivery of electrical charging power to electric vehicles is desirable.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a vehicle charging station for use in transmitting charging power to an electric vehicle for use in charging the vehicle is configured to communicatively couple to the electric vehicle via a network connection to a wireless network provider and electrically couple to the electric vehicle via a connector. Vehicle charging station is further configured to receive a unique identifier from the electric vehicle via the network connection, deliver a quantity of electrical charging power to the electric vehicle via the connector, and meter the quantity of electrical charging power delivered to the electric vehicle.

In another aspect, a vehicle charging system for use with charging an electric vehicle includes a vehicle charging station configured to communicatively couple to the electric vehicle via a network connection to a wireless network provider, electrically couple to the electric vehicle via a connector, receive a unique identifier of the electric vehicle via the network connection, and deliver a quantity of electrical charging power to the electric vehicle via the connector. Vehicle charging station further includes a server system coupled to said vehicle charging station, said server system configured to determine an account associated with the identifier, and determine a transaction amount based on the quantity of electrical charging power delivered to the electric vehicle by said vehicle charging station.

In yet another aspect, a method for charging an electric vehicle includes communicatively coupling a vehicle charging station to the electric vehicle via a network connection to a wireless network provider and electrically coupling the vehicle charging station to the electric vehicle via a connector. The method further includes receiving a unique identifier of the electric vehicle via the network connection, determining an account associated with the identifier, delivering a quantity of electrical charging power to the electric vehicle via the connector, and determining a transaction amount based on the quantity of electrical charging power delivered to the electric vehicle at the vehicle charging station.

DETAILED DESCRIPTION OF THE INVENTION

As used herein, the term "electric vehicle" includes any vehicle that includes one or more electric motors that are used for propulsion, such as an all-electric vehicle that uses only electricity, and/or a plug-in hybrid-electric vehicle that uses a gas powered engine in combination with batteries charged by an external power source or an engine and generator, to propel the vehicle. In addition, the term "electric vehicle" includes any suitable vehicle known to those skilled in the art and guided by the teachings herein provided that is capable of performing the functions described herein. Moreover, the term "wireless network provider" refers generally to an entity providing a wireless communications network that includes two or more wireless communication devices. Those having ordinary skill in the art and guided by the teachings herein provided would understand that a wireless network provider enables communications of any type or combination of information, including, without limitation, audio, video, and/or data.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may also include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary energy delivery system environment, embodiments of the invention are operational with numerous other general purpose or special purpose computing system environments or configurations. The energy delivery system environment is not intended to suggest any limitation as to the scope of use or functionality of any aspect of the invention. Moreover, the energy delivery system environment should not be interpreted as having any dependency or requirement relating to any one or combination of components illustrated in the exemplary operating environment. Examples of well known systems, environments and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the methods, systems, and vehicle charging station herein include at least one of communicatively coupling a vehicle charging station to the electric vehicle via a network connection to a wireless network provider, electrically coupling the vehicle charging station to the electric vehicle via a connector, receiving a unique identifier of the electric vehicle via the network connection, determining an account associated with the identifier, determining whether to approve or deny service to the electric vehicle, delivering a quantity of electrical charging power to the electric vehicle via the connector, metering the quantity of electrical charging power delivered, determining a transaction amount based on the quantity of delivered electrical charging power, and deducting the transaction amount from the account.

Figure 1:
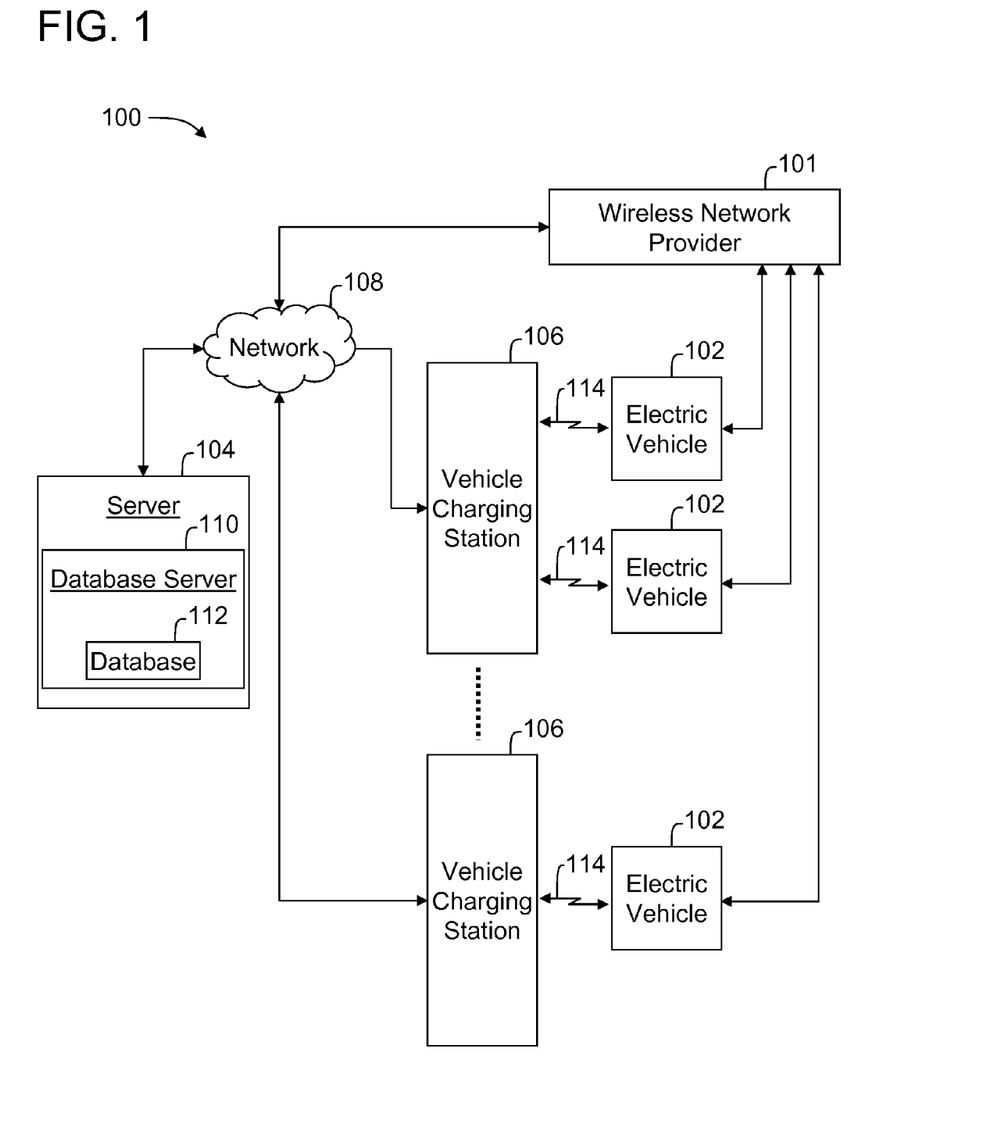
FIG. 1 is a simplified block diagram of an exemplary electricity delivery system for use with an electric vehicle.

FIG. 1 is a simplified block diagram of an exemplary electricity delivery system 100 for use with a wireless network provider 101 and an electric vehicle 102. In the exemplary embodiment, system 100 includes a server system 104 and a vehicle charging station 106 that is coupled to server system 104. As shown in FIG. 1, server system 104 may be coupled to a plurality of vehicle charging stations 106. In one embodiment, vehicle charging station 106 is coupled to a network 108 that enables vehicle charging station 106 to access server system 104 over network 108. In one embodiment, network 108 includes a private network such as a wide area network. In another embodiment, network 108 includes a public network, such as the Internet. In the exemplary embodiment, vehicle charging stations 106 are connected to network 108 through many interfaces such as a local area network (LAN), a wide area network (WAN), dial-in-connections, cable modems, wireless modems, and/or special high-speed Integrated Services Digital Network (ISDN) lines. A database server 110 includes a database 112 that contains information on a variety of matters, such as account information related to electric vehicle power distribution. In the exemplary embodiment, centralized database 112 is stored in server system 104 and is accessed via at least one vehicle charging station 106. In an alternative embodiment, database 112 is stored remotely from server system 104 and may be non-centralized. Moreover, in the exemplary embodiment, each vehicle charging station 106 is capable of electrically coupling to one or more electric vehicles 102 via a connector 114 and providing electrical charging power to one or more electric vehicles 102 via connector 114. Each electric vehicle 102 stores the electrical charging power and uses the stored power for propulsion, rather than, or in addition to, more conventional energy sources such as gasoline.

As described in more detail below, in the exemplary embodiment, each electric vehicle 102 includes a unique identifier that is used by vehicle charging station 106 and/or server 104 to identify the electric vehicle 102 and/or an account associated with electric vehicle 102. For example, database 112 may include transactional and/or accounting data related to prepayment information associated with a quantity of electrical charging power that has been paid for in advance for later distribution to electric vehicle 102. Moreover, database 112 may include historical electrical charging power distribution data, such as transaction dates, and/or a quantity of electrical charging power delivered to electric vehicle 102 for each transaction. Further, database 112 may include historical payment information, such as prepayment dates and/or prepayment amounts.

Moreover, those having ordinary skill in the art and guided by the teachings herein provided should understand that wireless network provider 101 can use any publicly accessible or any proprietary system, and can use any appropriate access and/or link protocol to communicate with electric vehicle 102, server system 104, and vehicle charging station 106, including, without limitation, analog, digital, packet-based, time division multiple access (TDMA), direct sequence code division multiple access (CDMA), frequency hopping CDMA, wideband code division multiple access (WCDMA), frequency division multiple access (FDMA), spread spectrum or any other known or future developed access or link protocol or methodology. The wireless network provider 101 can further use any of a variety of networking protocols, such as, User Datagram Protocol (UDP), Transmission Control Protocol/Internet Protocol (TCP/IP), AppleTalk™, Inter-Packet Exchange/Sequential Packet Exchange (IPX/SPX), Network Basic Input Output System (Net BIOS), or any proprietary or non-proprietary protocol, to communicate digital voice, data and/or video with electric vehicle 102. Further, using network 108, wireless network provider 101 can communicate with vehicle charging station 106 and server 104 using any appropriate access protocol, link protocol, and/or network protocol as described above and as is known by those having ordinary skill in the art and guided by the teachings herein.

The embodiments illustrated and described herein as well as embodiments not specifically described herein, but within the scope of aspects of the invention, constitute exemplary means for identifying an electric vehicle via a network connection to a wireless network provider and providing electrical charging power delivery and metering for the electric vehicle. For example, server system 104 or vehicle charging station 106, or any other similar computer device that is programmed with computer-executable instructions, as illustrated in FIG. 1, provides exemplary means for identifying an electric vehicle using a wirelessly communicated identifier.

Figure 2:
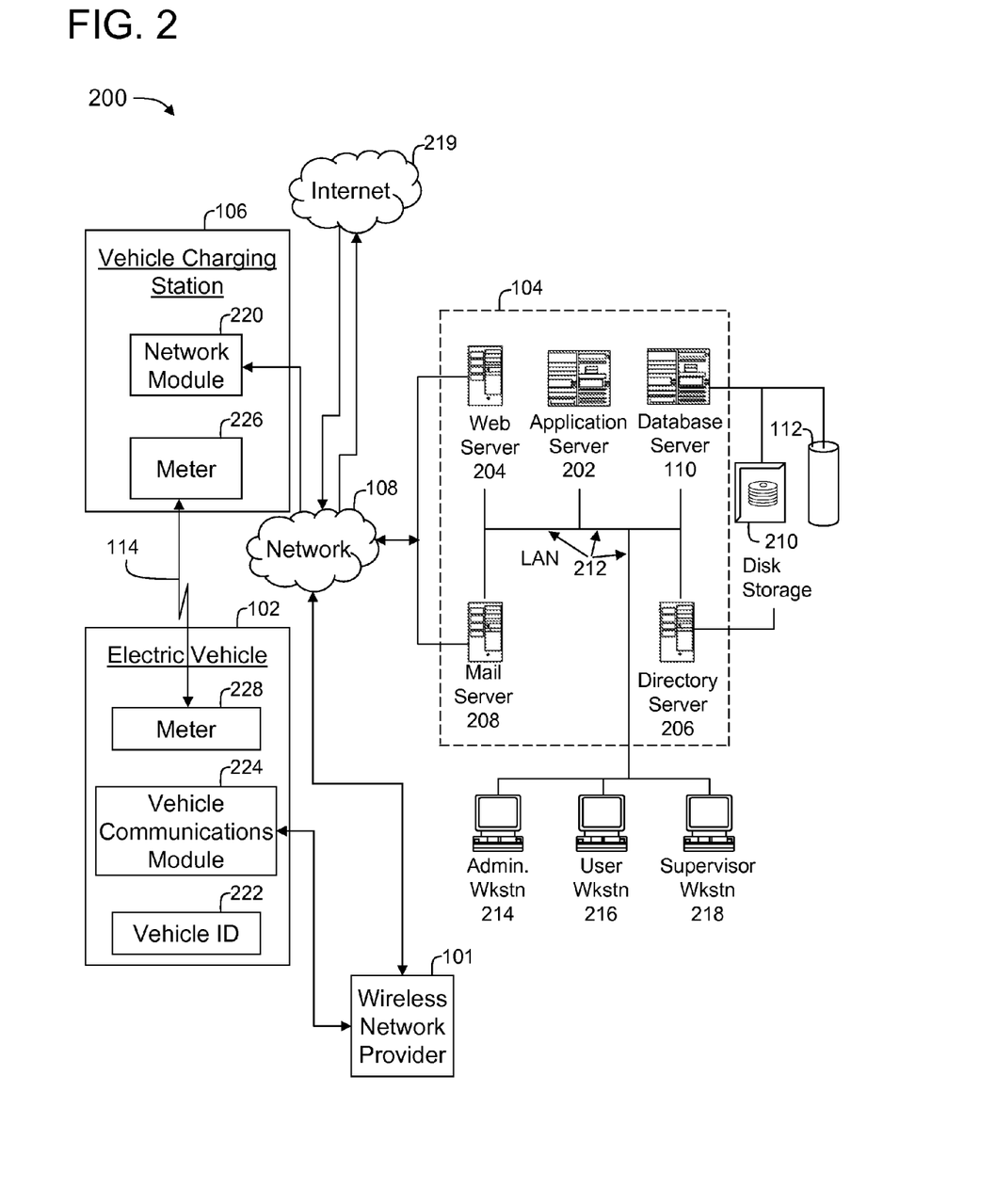
FIG. 2 is an expanded block diagram of an exemplary embodiment of a system architecture of the system shown in FIG. 1.

FIG. 2 is an expanded block diagram of an exemplary system architecture 200 of system 100 (shown in FIG. 1). Components in system architecture 200 that are identical to components of system 100 are identified in FIG. 2 using the same reference numerals used in FIG. 1. In the exemplary embodiment, system 200 includes server system 104 and vehicle charging stations 106. Server system 104 also includes database server 110, an application server 202, a web server 204, a directory server 206, and a mail server 208. A disk storage unit 210 is coupled to database server 110 and to directory server 206. Disk storage unit 210 may include, but is not limited to only including, a Network Attached Storage (NAS) device and/or a Storage Area Network (SAN) device. In one embodiment, database 112 is stored in database server 110. In the exemplary embodiment, database 112 is coupled to database server 110. Servers 110, 202, 204, 206, and 208 are coupled in a local area network (LAN) 212. Moreover, a system administrator workstation 214, a user workstation 216, and a supervisor workstation 218 may be coupled to LAN 212 to enable communication with server system 104. Alternatively, workstations 214, 216, and 218 may be coupled to LAN 212 using a link to an Internet 219, or may be coupled through a private network. In one embodiment, an owner or user of electric vehicle 102 may access server system 104 via web server 204 to access, for example, the user's account and/or a payment service that enables the user to pay for electrical charging power that has been delivered to electric vehicle 102 via connector 114 or will be delivered to electric vehicle 102. Moreover, in one embodiment, mail server 208 may be configured to send a message, such as an email message, to the user when the user's account balance falls below a predetermined balance. Alternatively, a user may setup a periodic reminder, wherein mail server 208 transmits a message to the user at a configurable periodic rate or when the account balance reaches a predetermined balance as a reminder to prepay for electrical charging power to be delivered later to electric vehicle 102. As used herein, the term "balance" includes any amount of money available in an account for use in paying for electrical charging power, such as an amount of cash on deposit and an amount of credit available on an account, including a credit card and line of credit.

Each vehicle charging station 106 includes a network module 220 that communicates with server system 104. For example, server system 104 is communicatively coupled to vehicle charging stations 106 to enable server system 104 to be accessed via the Internet 219. The systems and processes, though, are not limited to being practiced using a WAN type communication method or Internet 219.

To facilitate communication between electric vehicle 102 and server system 104 via wireless network provider 101, electric vehicle 102 includes a unique vehicle identifier 222 that is embedded within electric vehicle 102. In the exemplary embodiment, identifier 222 is a number generated by server system 104 upon creation of the user's account. In other embodiments, unique vehicle identifier 222 includes a manufacturer provided vehicle identification number (VIN) of electric vehicle 102. In other embodiments, identifier 222 can be one or more of an electrical charging power supplier account number, a pre-paid stored value account number, a credit account number, or any suitable identifying number of a type known to those skilled in the art and guided by the teachings herein provided that is capable of being used as described herein. In one embodiment, unique vehicle identifier 222 is accessible only upon authorization by the user of electric vehicle 102, as to restrict unauthorized access to unique vehicle identifier 222. In another embodiment, a new unique vehicle identifier 222 is generated after completion of one or more of transactions for the delivery of electrical charging power, and identifier 222 is stored in electric vehicle and server system 104 for a subsequent transaction. Electric vehicle 102 also includes a vehicle communications module 224 for use in communicatively coupling electric vehicle to server system 104 and to vehicle charging station 106 via a network connection to wireless network provider 101.

In the exemplary embodiment, identifier 222 is linked in database 112 to an account associated with electric vehicle 102. An account balance is maintained within database including prepayments made to the account by the account owner. Alternatively, identifier 222 may be linked to an account associated with a person, such that an account balance may be allocated among one or more electric vehicles 102. Further, in the exemplary embodiment, each vehicle charging station 106 includes a station meter 226 that tracks a quantity of electrical charging power delivered to electric vehicle 102 via connector 114. Moreover, in the exemplary embodiment, electric vehicle 102 includes a vehicle meter 228 that tracks a quantity of electrical charging power received by electric vehicle 102 via connector 114.

During use, when a customer desires to charge electric vehicle 102 via vehicle charging station 106, electric vehicle 102 is communicatively coupled to vehicle charging station 106 via wireless network provider 101 and to server system 104, and electric vehicle 102 is electrically coupled to vehicle charging station 106 via connector 114. More specifically, identifier 222 is transmitted to server system 104 via wireless network provider 101, and server system 104 determines an account associated with identifier 222. In the exemplary embodiment, either wireless network provider 101 and/or server system 104 are operated by an entity other than an electrical charging power supplier, such as a manufacturer of electric vehicle 102, for example, General Motor's OnStar system, Toyota Motor Corporation's G-Book system, Hughes Telematics, as well as other telemetry and telematic-type system providers. In another embodiment, network provider 101 and/or server system 104 are owned and/or operated by the electrical charging power supplier. In the exemplary embodiment, after server system 104 has determined the account associated with identifier 222, server system 104 determines an account balance. In such an embodiment, if the account balance meets a predetermined balance, server system 104 instructs vehicle charging station 106 to enable service to electric vehicle 102. Alternatively, if the account balance does not meet the predetermined balance, server system 104 may instruct vehicle charging station 106 to deny service to electric vehicle 102 and display a message to the user/customer stating the reason for the denial. Further, in such an embodiment, server system 104 may issue a temporary credit to the account balance.

In another embodiment, electric vehicle 102 also transmits a location of electric vehicle 102 and/or vehicle charging station 106. In such an embodiment, electric vehicle 102 may obtain the location from a Global Positioning Satellite receiver (not shown) in electric vehicle 102, from wireless network provider 101, from vehicle charging station 106, or from any means known to those skilled in the art that is capable of performing the functions described herein. Moreover, in such an embodiment, server system 104 may use the location information to determine a different rate per unit of electrical charging power for service to electric vehicle 102. Further, in such an embodiment, server system 104 may also use the location information to determine an availability of electrical charging power to vehicle charging station 106, and based on such a determination, vehicle charging station 106 may deny service to electric car or delay service to electric car for a period of time, as to avoid, for example, peak charging times, a per unit cost higher than desired by the user or the owner of electric car 102, or an electricity shortage. In another embodiment, server system 104 also communicates with electric vehicle 102 to request the delay of service to avoid, for example, peak charging times, a per unit cost higher than desired by the user or the owner of electric car 102, or an electricity shortage.

In one embodiment, vehicle charging station 106 meters electrical charging power delivery to electric vehicle 102 via connector 114 at different rate per unit of electrical charging power, such as a higher rate, when a temporary credit is issued. In another embodiment, server system 104 may instruct vehicle charging station 106 to deny service to electric vehicle 102 when the account associated with identifier 222 has been put into a hold state. In such an embodiment, a hold state may be placed on the account based on, for example, a delinquent payment by the customer and/or a report of electric vehicle 102 being stolen.

In the exemplary embodiment, when service to electric vehicle 102 is enabled, vehicle charging station 106 delivers a quantity of electrical charging power to electric vehicle 102 via connector 114. During delivery, vehicle charging station 106, via station meter 226, and electric vehicle 102, via vehicle meter 228, each meter the quantity of electrical charging power delivered and/or a transaction amount based on the quantity of electrical charging power delivered. A final transaction amount is determined at the conclusion of the delivery of the electrical charging power, the final transaction amount is transmitted to server system 104, and server system 104 deducts the final transaction amount from the account balance. If the final transaction amount is greater than the account balance, server system 104 may issue a temporary credit using a different rate, such as a higher rate, as described above. In addition, in one embodiment, upon the conclusion of the delivery of the electrical charging power, station meter 226 and vehicle meter 228 compare the quantity of electrical charging power delivered and/or the final transaction amount. If the comparison results in a match, then vehicle meter 228 generates a receipt. In one embodiment, the receipt is stored in vehicle meter 228. In another embodiment, the receipt is also transmitted to vehicle charging station 106 for storage in server system 104. This comparison facilitates enabling accuracy of the metered quantity of electrical charging power delivered and/or ensuring that the correct transaction amount is billed to the account and/or deducted from the account balance. Moreover, the comparison facilitates ensuring that, if there are multiple electric vehicles 102 receiving electrical charging power from vehicle charging station 106, the correct account is billed.

Figure 3:
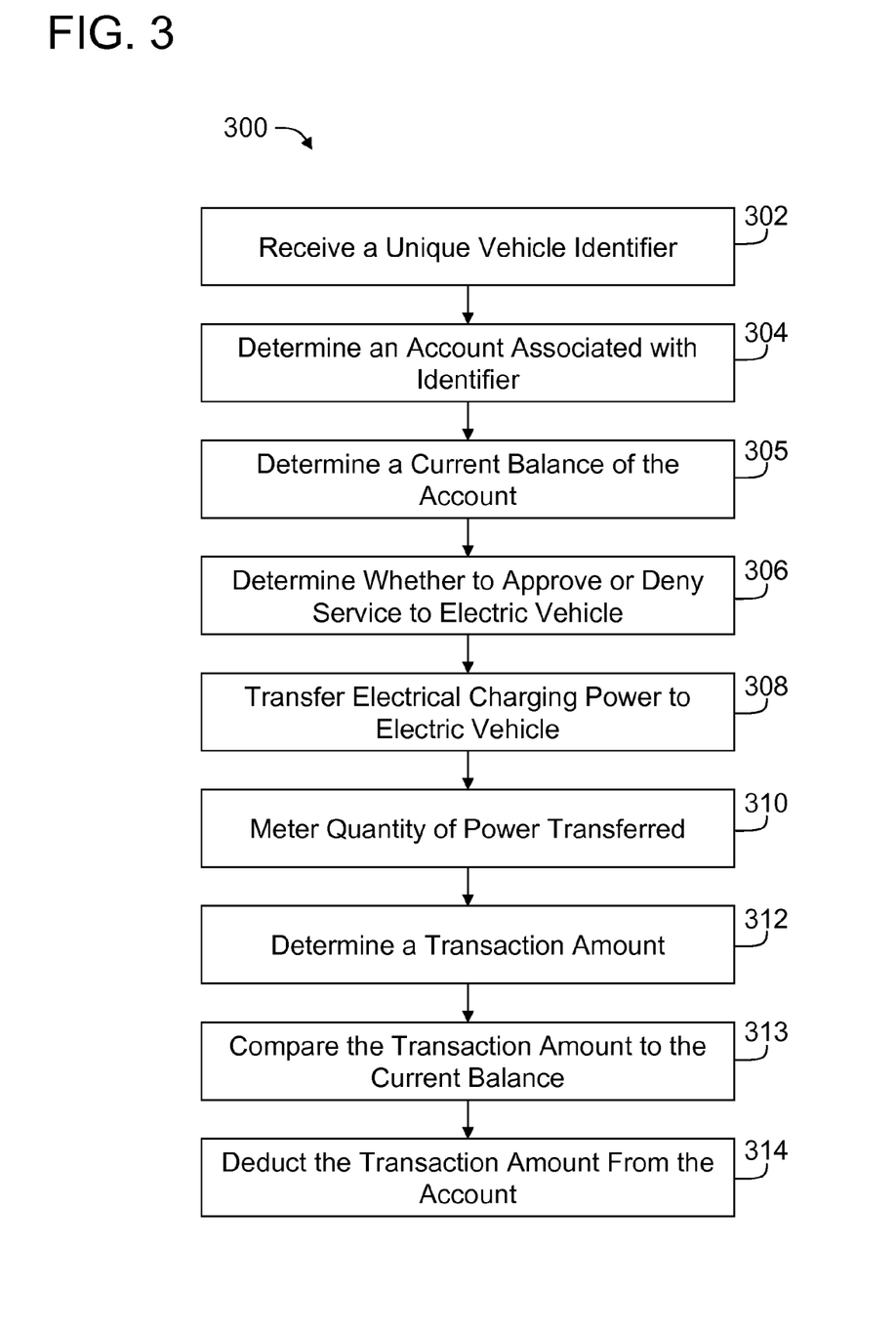
FIG. 3 is a flowchart illustrating an exemplary method for use in delivering electrical charging power to an electric vehicle using the system shown in FIGS. 1 and 2.

FIG. 3 is a flowchart 300 illustrating an exemplary method for use in delivering electrical charging power to electric vehicle 102 (shown in FIGS. 1 and 2) using the system shown in FIGS. 1 and 2. In the exemplary embodiment, vehicle charging station 106 (shown in FIGS. 1 and 2) is communicatively coupled 301 to electric vehicle 102 (shown in FIGS. 1 and 2) via the network connection to wireless network provider 101 (shown in FIGS. 1 and 2), and vehicle charging station 106 is also electrically coupled 302 to electric vehicle 102 via connector 114 (shown in FIGS. 1 and 2). Further, in the exemplary embodiment, server system 104 (shown in FIGS. 1 and 2) receives 303 unique vehicle identifier 222 (shown in FIG. 2) from electric vehicle 102 via the network connection. In the exemplary embodiment, electric vehicle 102 and, more specifically, identifier 222, is associated with a customer account. Server system 104 determines 304 an account associated with identifier 222. More specifically, server system 104 determines 304 the user account associated with identifier 222 within database 108 (shown in FIGS. 1 and 2). In the exemplary embodiment, server system 104 then determines 305 a current balance of the customer account.

In one embodiment, server system 104 determines 306 whether to approve or to deny service to electric vehicle 102 and transmits the determination to vehicle charging station 106. In such an embodiment, if the current balance is less than a predetermined amount, the customer is denied service at vehicle charging station 106. Further, in such an embodiment, the customer may be prompted to insert a credit card or cash into a payment accepter device (not shown) coupled to vehicle charging station 106. In one embodiment, service may be denied by server system 104 if a stolen car report associated with electric vehicle 102 exists. In the exemplary embodiment, the current account balance may be increased by the account holder remotely using, for example, user workstation 216 (shown in FIG. 2). For example, in one embodiment, the customer may login to server system 104 via user workstation 216 in order to access a payment program that enables the customer to designate a payment amount to be applied to the account balance. In such an embodiment, the customer also designates a payment source including, but not limited to, a credit card, a debit card, and/or a banking account. The payment amount, in such an embodiment, is then credited to the account balance.

In the exemplary embodiment, a quantity of electrical charging power is delivered 308 to electric vehicle 102 via vehicle charging station 106 through connector 314, and the quantity of electrical charging current delivered is metered 310. A transaction amount is determined 312 based on an actual quantity of electrical charging power delivered to electric vehicle 102 at vehicle charging station 106. More specifically, station meter 226 (shown in FIG. 2) meters the quantity of electrical charging power delivered. In one embodiment, vehicle charging station 106 determines 312 the transaction amount based on the quantity of electrical charging power delivered and transmits the transaction amount to server system 104. In another embodiment, vehicle charging station 106 transmits, to server system 104, the quantity of electrical charging power delivered to electric vehicle 102, and server system 104 determines 312 the transaction amount based on the quantity of electrical charging power delivered 308. In the exemplary embodiment, the transaction amount is then compared 313 to the current balance in the customer account. If the transaction amount is less than the current balance, the transaction amount is deducted 314 from the current balance. The new balance is then stored in database 112. In one embodiment, the new balance is transmitted by server system 104 to vehicle charging station 106 and is displayed to the user/customer.

In an alternative embodiment, the new balance is also transmitted to electric vehicle 102 via the network connection to wireless network provider 101 and is displayed to the customer via vehicle meter 228 (shown in FIG. 2). If the current balance is less than the transaction amount, the customer account may be credited with the difference between the transaction amount and the current balance, and the customer may be billed for the difference at a later time. In such an embodiment, the billing rate may be changed for any electrical charging power distributed on credit. Alternatively, the customer may be prompted to submit payment to vehicle charging station by, for example, the customer being prompted to insert a credit card into the payment acceptance device (not shown) coupled to vehicle charging station 106. In the exemplary embodiment, a confirmation of the receipt of the delivered electrical charging power is generated 308 by vehicle meter 228. The receipt may be used by the customer to verify a quantity of electrical charging power delivered and/or a cost per unit of electrical charging power. The receipt may be generated by electric vehicle 102 and stored in electric vehicle 102 and database 112. Alternatively, the receipt may be generated by server system 104, stored in database 112, and transmitted to electric vehicle 102 via a network connection to wireless network provider 101. In addition, in one embodiment, an adjusted current balance may be displayed to the customer via vehicle charging station 106 to reflect a deduction of the transaction amount from the account.

Described in detail herein are exemplary embodiments of methods, systems, and computers that facilitate delivering electrical charging power to vehicles, such as electric vehicles. More specifically, the embodiments described herein facilitate identifying an electric vehicle at a vehicle charging station using a unique identifier embedded within the electric vehicle. Identifying an electric vehicle via a network connection to a wireless network provider facilitates automatic deduction of a transaction amount from an account. Such an automatic deduction facilitates time savings for a customer and greater ease in collecting revenue for an electric distribution utility.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A vehicle charging system for use with charging an electric vehicle that includes a vehicle communications module, said system comprising:
   a vehicle charging station comprising a meter and a connector, said vehicle charging station configured to:

communicatively couple to a first network that is communicatively coupled to a second network that is configured to communicatively couple wirelessly to the vehicle communications module; and
electrically couple to the electric vehicle via said connector; and
a server system communicatively coupled to said vehicle charging station through the first network, said server system configured to be communicatively coupled to the electric vehicle through the vehicle communications module that is connected to the second network that is connected to the first network, and said server system configured to:
receive a unique identifier associated with the electric vehicle from the first network, the unique identifier transmitted from the vehicle communications module to the second network and subsequently routed from the second network, through the first network, to said server system;
determine an account associated with the unique identifier;
determine whether to approve service to the electric vehicle based on the account; and
transmit an approval to said vehicle charging station upon a determination to approve service, wherein the approval is transmitted from said server system to the first network, and wherein the approval is further routed from the first network to the vehicle charging station;
wherein said vehicle charging station is further configured to:
receive the approval from said server system;
deliver a quantity of electrical charging power to the electric vehicle via the connector based on the approval; and
meter the quantity of electrical charging power delivered by said vehicle charging station to the electric vehicle using said meter; and
wherein said server system is further configured to:
determine a transaction amount based on the metered quantity of electrical charging power delivered to the electric vehicle by said vehicle charging station; and
compare the transaction amount to a balance of the account.

2. A system in accordance with claim 1, wherein said server system comprises a database and a computer coupled to said database, said computer is configured to:
access said database;
search for the identifier in said database; and
determine the account based on results of the searching.

3. A system in accordance with claim 1, wherein said meter is further configured to transmit a numerical representation of the metered quantity of electrical charging power delivered to said server system.

4. A system in accordance with claim 1, wherein said server system is configured to deduct the transaction amount from the account.

5. A system in accordance with claim 1, wherein said server system is further configured to:
determine a current balance of the account; and
determine whether the current balance exceeds a predetermined amount.

6. A system in accordance with claim 5, wherein said server system is further configured to transmit a request to a user to add additional funds to the account upon a determination that the current balance does not exceed the predetermined amount.

7. A system in accordance with claim 1, wherein said server system is further configured to:
determine whether a stolen car report is associated with the electric vehicle; and
transmit a denial of service instruction to said vehicle charging station upon a determination that an associated stolen car report exists.

8. A method for charging an electric vehicle that includes a vehicle communications module, said method comprising:
communicatively coupling a vehicle charging station and a server system to a first network that is communicatively coupled to a second network that is configured to communicatively couple wirelessly to the vehicle communications module;
electrically coupling the vehicle charging station to the electric vehicle via a connector;
receiving, at the server system, a unique identifier associated with the electric vehicle from the vehicle communications module through the first network, the unique identifier transmitted from the vehicle communications module to the second network and subsequently routed from the second network, through the first network, to the server system;
determining, by the server system, an account associated with the unique identifier;
determining, by the server system, whether to approve service to the electric vehicle based on the account;
transmitting, from the server system, an approval to the vehicle charging station based on the determination whether to approve service, wherein the approval is transmitted from the server system to the first network, and wherein the approval is further routed from the first network to the vehicle charging station;
receiving, at the vehicle charging station, the approval;
delivering, by the vehicle charging station, a quantity of electrical charging power to the electric vehicle via the connector based on the approval;
metering, by the vehicle charging station, the quantity of electrical charging power delivered by the vehicle charging station to the electric vehicle;
determining, by the server system, a transaction amount based on the metered quantity of electrical charging power delivered to the electric vehicle at the vehicle charging station; and
comparing, by the server system, the transaction amount to a balance of the account.

9. A method in accordance with claim 8, wherein determining an account further comprises:
accessing said database;
searching for the identifier in the database; and
determining the account based on results of the searching.

10. A method in accordance with claim 8, wherein metering the quantity of electrical charging power delivered comprises metering, by at least one of the vehicle charging station and the electric vehicle, the quantity of electrical charging power delivered to the electric vehicle.

11. A method in accordance with claim 8, further comprising deducting the transaction amount from the account.

12. A method in accordance with claim 8, wherein determining whether to approve service to the electric vehicle comprises:
determining a current balance of the account; and
determining whether the current balance exceeds a predetermined amount.

13. A method in accordance with claim 12, further comprising transmitting a request to a user to add additional funds to the account upon a determination that the current balance does not exceed the predetermined amount.

* * * * *